United States Patent [19]

DeMario et al.

[11] Patent Number: 4,692,302
[45] Date of Patent: Sep. 8, 1987

[54] COOLANT FLOW MIXER GRID FOR A NUCLEAR REACTOR FUEL ASSEMBLY

[75] Inventors: Edmund E. DeMario, Penn Hills; Raymond F. Boyle, Monroeville; Peter J. Kuchirka, Penn Hills, all of Pa.

[73] Assignee: Westinghouse Electric Corp., Pittsburgh, Pa.

[21] Appl. No.: 567,450

[22] Filed: Dec. 30, 1983

[51] Int. Cl.⁴ .............................................. G21C 3/34
[52] U.S. Cl. .................................... 376/439; 376/442
[58] Field of Search .............. 376/438, 439, 442, 443, 376/462

[56] References Cited

U.S. PATENT DOCUMENTS

| | | | |
|---|---|---|---|
| 3,379,619 | 4/1968 | Andrews et al. | 376/439 |
| 3,395,077 | 7/1968 | Tong et al. | 376/439 |
| 3,809,609 | 5/1974 | Krawiec et al. | 376/439 |
| 3,933,584 | 1/1976 | Litt | 376/439 |
| 4,061,536 | 12/1977 | Creagan et al. | 376/439 |
| 4,155,807 | 5/1979 | Schreiber et al. | 376/438 |
| 4,224,107 | 9/1980 | Delatosse et al. | 376/462 |
| 4,388,269 | 6/1983 | Larson | 376/439 |
| 4,474,730 | 10/1984 | Hellman et al. | 376/462 |
| 4,492,844 | 1/1985 | Kobuck et al. | 376/438 |

*Primary Examiner*—Deborah L. Kyle
*Assistant Examiner*—Richard L. Klein

[57] ABSTRACT

An improved grid structure is provided for a nuclear reactor fuel assembly whose sole purpose is to promote a crossflow mixing of the coolant through the fuel assembly rather than the support of the fuel rods. The grid straps form an egg-crate configuration creating cell openings for receiving the fuel rods. Associated with each cell opening is at least one coolant flow mixing vane that projects over the cell opening and four dimple protrusions which are open to the flow of coolant therethrough. The dimple protrusions extend into the cell opening to a further extent than the mixing vane so as to prevent damaging impact of the fuel rod with a vane upon transverse movement of the fuel rod across the cell opening. In reducing the pressure drop of the coolant flow through the assembly, the height of the inner grid straps is substantially less than the height of the outer border strap.

3 Claims, 16 Drawing Figures

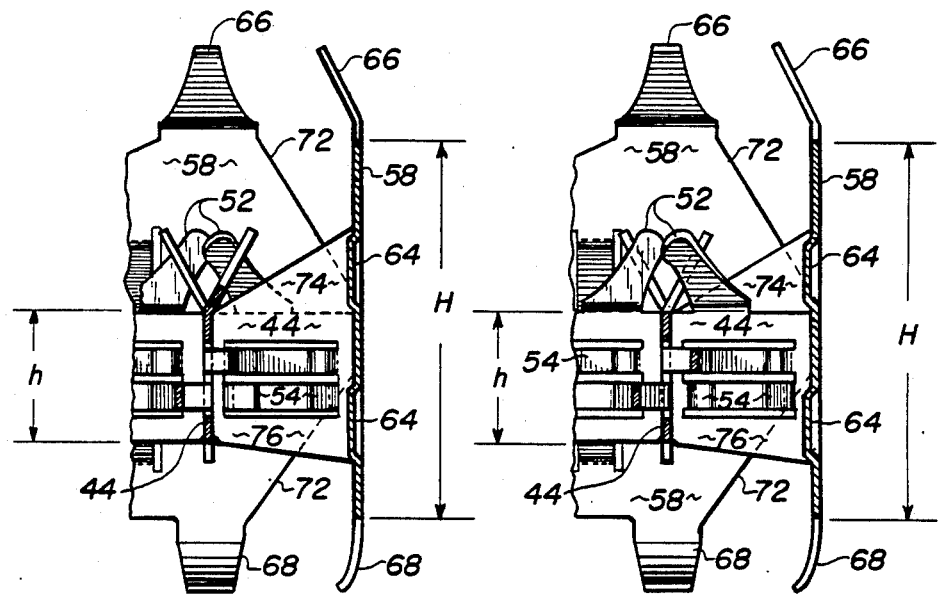
Fig. 6  Fig. 7
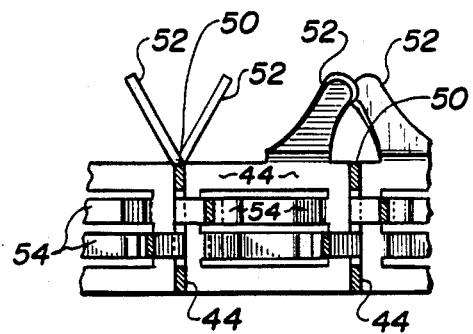 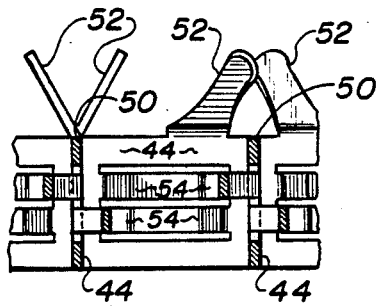
Fig. 8  Fig. 9

COOLANT FLOW MIXER GRID FOR A NUCLEAR REACTOR FUEL ASSEMBLY

CROSS REFERENCE TO RELATED APPLICATIONS

Reference is hereby made to the following copending applications dealing with related subject matter and assigned to the asignee of the present invention:

1. "A Low Pressure Drop Grid For A Nuclear Reactor Fuel Assembly," by Edmund E. DeMario and David Sperhac; U.S. Ser. No. 567,448, filed Dec. 30, 1983.
2. "A Partial Grid For A Nuclear Reactor Fuel Assembly," by Edmund E. DeMario; U.S. Ser. No. 564,049, filed Dec. 21, 1983.

BACKGROUND OF THE INVENTION

The present invention relates generally to fuel assemblies for nuclear reactors and, more particularly, is directed to a grid structure for providing cross mixing of the upward coolant flow.

The power output of a nuclear reactor is limited by the rate at which heat can be removed from the reactor core, and the rate of heat transfer determines the temperatures developed in a reactor core. The power output is also limited by the amount of structural material in the reactor core, as the structural material parasitically absorbes neutrons which could otherwise be used in the fission process.

One general structural form commonly used for providing a nuclear fuel inventory in nuclear reactors is that in which a plurality of elongated fuel elements or rods are arranged, within a prescribed volume, in a parallel array in an upstanding direction between the upper and lower reactor core plates. To provide integrity in the support relations, the fuel rods are divided into groups and the rods in each group are formed as a fuel assembly. Generally, in most reactors, a fluid coolant such as water, is directed upwardly through openings in the lower core support plate and along the fuel rods of the various fuel assemblies to receive the thermal energy therefrom.

Generally, heat is not generated uniformly in a reactor. The heat flux decreases axially and radially from a peak at the center of the reactor, or near the center if the reactor is not symmetrical in configuration, and this variation occurs even among the fuel rods within a single fuel assembly. The power variation results in variations in the enthalpy rise of the coolant among the different coolant flow channels throughout the reactor core. In addition, local pertubations in heat generation can occur because of inhomogeneities in the reactor structure. These variations impose special considerations in the design of the reactor cooling systems, including the need for establishing variations in coolant flow rate through the reactor to achieve uniform temperature rise in the coolant, avoiding local hot-spot conditions, and avoiding local thermal stresses and distortions in the structural members of the reactor. Along with these considerations, designers are always working toward minimizing the amount of structural materials in a fuel assembly for reducing the pressure drop to thereby increase the output of a reactor. Still further, due to the closeness of positioning of one fuel assembly among adjacent fuel assemblies in a reactor core, designers must take into consideration the structural integrity of each fuel assembly such that it can be installed and removed without interfering with an adjacent assembly.

In order to achieve a more uniform temperature rise in the coolant, avoid local hot-spot conditions and average the enthalpy rise to maximize power output, it has been found to be highly desirable to mix the coolant flow in a given fuel assembly, as well as in adjacent fuel assemblies. This was recognized by Tong, et al. in U.S. Pat. No. 3,395,077, which sets forth a grid structure, for a can-type fuel assembly, having openings therein through which the fuel elements extend and which is provided with planar mixing vanes for deflecting the coolant from one flow channel laterally across at least a portion of an adjacent coolant channel. The grid straps in Tong, et al. are all of the same height and the grid is axially supported by the walls of the vertically extending can structure. Among other shortcomings of the Tong, et al. device, the fuel rods have the tendency to come into damaging contact with the mixing vanes upon vibration of the rods and bending and bowing of the rods due to thermal induced stresses.

Based upon the teachings of the Tong, et al. patent, Andrews, et al. in U.S. Pat. No. 3,379,619, incorporated the mixing vanes directly on the positioning grids of a canless-type fuel assembly, such as the one shown in Creagan, et al. in U.S. Pat. No. 4,061,536. The positioning grids are mounted on the longitudinally extending control rod guide thimbles and support the fuel rods against lateral displacement and, to a given extent, frictionally against longitudinal movement. The use of the same device to both space the fuel rods and produce a lateral mixing flow places limitations on the mixing pattern that can be achieved. To increase the mixing or produce another flow pattern requires the introduction of yet another mixing support grid which has the disadvantage of adding further structural materials in resulting in an increase of the pressure drop. Yet another disadvantage of the Andrews, et al. device is that the corners of the grid interfere with and catch on the respective corners of the grids of adjacent fuel assemblies as a fuel assembly is installed into and removed from the reactor core. This problem is intensified after irradiation of a fuel assembly for a given period of time.

SUMMARY OF THE INVENTION

The present invention provides a nuclear reactor fuel assembly with an improved grid structure for producing a lateral coolant flow to induce cross flow mixing of the coolant across the fuel rods of a fuel assembly as well as of adjacent assemblies so as to promote mixing and even heating of the coolant, while at the same time, insuring that the fuel rods do not come into damaging contact with the mixing vanes. Thus, the coolant in a flow channel having a higher enthalpy and/or temperature is mixed with the coolant in another flow channel having a lower enthalpy and/or temperature to produce an outlet coolant mixture having an average enthalpy and/or temperature to thereby increase the power output of the reactor core. The improved grid structure is of a reduced size, with the outer straps being of a greater height than the inner straps, but of a structural integrity of a full size support grid in thus minimizing the parasitic structural material utilized in the fuel assembly to thereby reduce the presssure drop through the reactor core. The construction of the grid structure is such that its respective outer corners are chamfered to facilitate the installing and removing of a fuel assembly among closely spaced fuel assemblies within a reactor core in thereby overcoming some of the problems experienced with prior art grid structures.

Accordingly, the present invention sets forth in a nuclear reactor fuel assembly including a number of longitudinally extending control rod guide thimbles, and a plurality of transverse grids axially spaced along the thimbles for supporting an array of upstanding fuel rods, an improved grid structure mounted on the thimbles and disposed between a pair of adjacent fuel rod support grids for promoting the mixing of a coolant as it flows longitudinally along and between the fuel rods, while minimizing the amount of structural material to thereby reduce the pressure drop in the fuel assembly. More particularly, the improved grid structure comprises a plurality of inner interleaved straps arranged in an egg-crate configuration in defining a plurality of inner cell openings for receiving therethrough respective ones of the fuel rods. An outer peripheral strap is attached to the respective terminal ends of the inner straps in forming an integral structure and in defining a number of border cell openings for receiving therethrough other ones of the fuel rods. At least one mixing vane is mounted on one of the inner straps associated with each inner cell and border cell opening and projects inwardly toward the longitudinal axis of the cell opening to deflect the upwardly flowing coolant laterally from one fuel rod to an adjacent fuel rod. Associated with each mixing vane is a protrusion mounted on one of the inner straps of a cell opening and extends into the cell opening so as to prevent damaging impact of the fuel rod with the vane should the fuel rod move transversely across the cell opening. Preferably, each inner cell opening contains four such protrusions with each of the protrusions being open to the longitudinal flow of coolant therethrough to reduce the pressure drop through the cell opening.

In reducing the amount of material to thereby reduce the pressure drop of the fuel assembly, yet providing a grid of structural integrity, the height of the inner straps are substantially less than the height of the outer strap. In the preferred embodiment the improved grid structure, in plan view, is generally square in shape with the outer peripheral strap being formed of four separate straps attached together in defining four separate corners. Preferably, the terminal end of each pair of adjacent outer straps forming a respective corner is provided with a chamfer so as to prevent the grid structure from interfering with a grid structure of another adjacent fuel assembly during installation and removal of the fuel assembly in the core region of a reactor.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is a sectional view, as taken along line 6—6 of FIG. 3, showing the interconnection of the end portion of one of the inner straps, with a reinforcing web, to the outer peripheral strap.

FIG. 7 is a sectional view, as taken along line 7—7 of FIG. 3, showing the interconnection of the end portion of one of the inner straps, without a reinforcing web, to the outer peripheral strap.

FIGS. 8, 9, 10 and 11 are sectional views, as taken along respective lines 8—8, 9—9, 10—10 and 11—11 of FIG. 3, showing the relationship of the dimple protrusions associated with the inner straps of a given fuel rod inner cell opening.

DETAILED DESCRIPTION OF THE INVENTION

Figure 1:
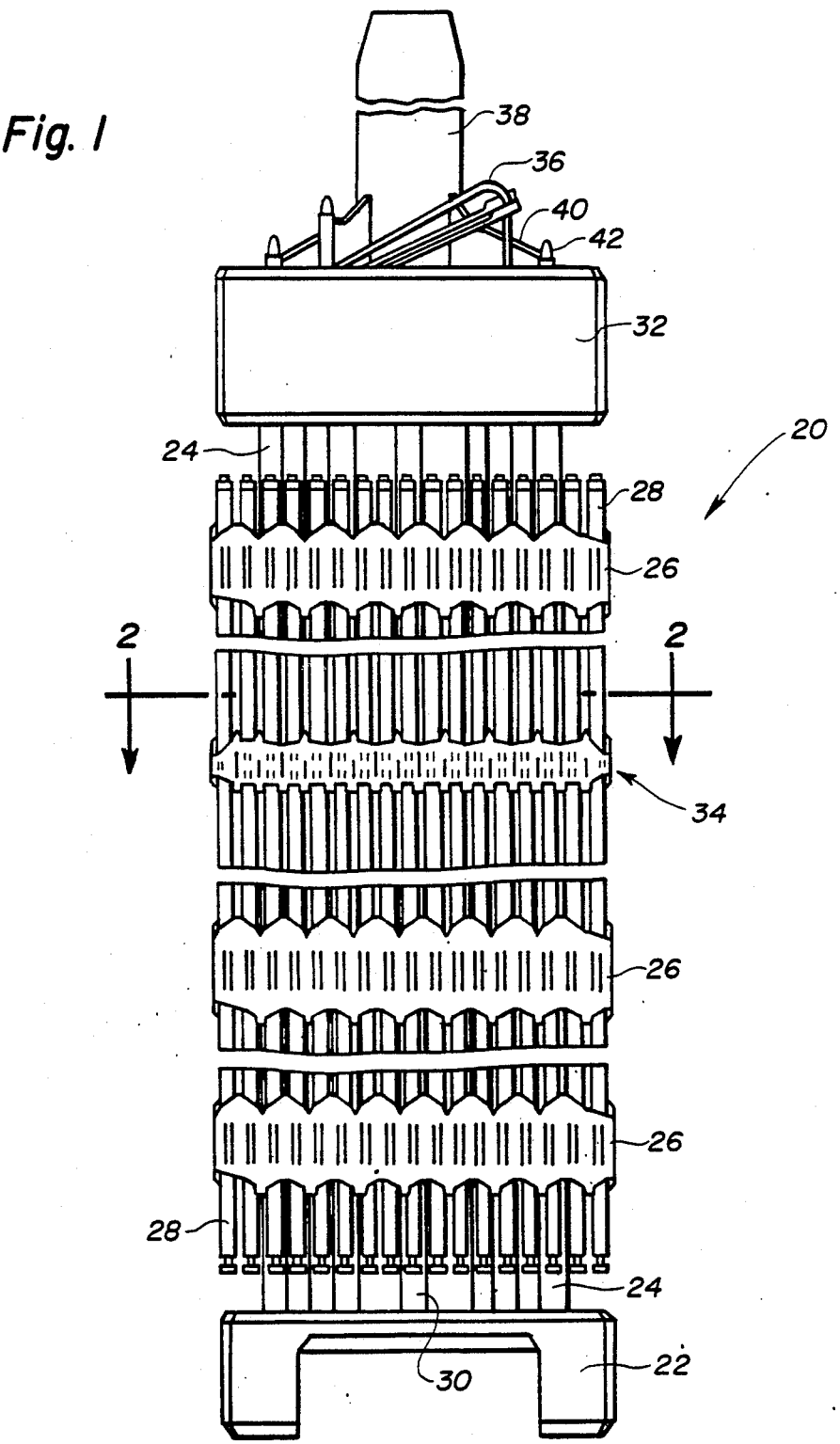
FIG. 1 is an elevational view of a conventional fuel assembly incorporating therewithin the improved grid structure in accordance with the principles of the present invention.

In the following description, like reference characters designate like or corresponding parts throughout the several views. Also in the following description, it is to be understood that such terms as "forward," "rearward," "left," "right," "upwardly," "downwardly" and the like, are words of convenience and are not to be construed as limiting terms.

In General

Referring now to the drawings, and particularly to FIG. 1, there is shown a conventional fuel assembly, being indicated generally by the numeral 20, which incorporates a preferred embodiment of the invention. The fuel assembly 20 basically comprises a lower end structure or bottom nozzle 22 for supporting the assembly on the lower core plate (not shown) in the core region of a reactor (not shown); a number of longitudinally extending control rod guide tubes or thimbles 24 projecting upwardly from the bottom nozzle 22; a plurality (only three of which are shown) of transverse support grids 26 axially spaced along the guide thimbles 24; an organized array of elongated fuel rods 28 transversely spaced and supported by the grids 26; an instrumentation tube 30 located in the center of the assembly; and an upper end structure or top nozzle 32 attached to the upper ends of the guide thimbles 24, in a conventional manner, to form an integral assembly capable of being conventionally handled without damaging the assembly components. The bottom nozzle 22 and the top nozzle 32 are conventional including end plates (not shown) with flow openings (not shown) for the upward longitudinal flow of a fluid coolant, such as water, to pass up and along the various fuel rods 28 to receive the thermal energy therefrom. To promote mixing of the coolant among the fuel rods 28, a mixing vane grid structure, constructed in accordance with the principles of the present invention and generally designated by the numeral 34, is disposed between a pair of support grids 26 and mounted on the guide thimbles 24. Mixing vane structure 34 will be discussed in detail later on in this specification.

The top nozzle 32 includes a transversely extending adapter plate (not shown) having upstanding sidewalls secured to the peripheral edges thereof in defining an enclosure or housing. An annular flange (not shown) is secured to the top of the sidewalls and suitably clamped to this flange are leaf springs 36 (only one of which being shown in FIG. 1) which cooperate with the upper core plate (not shown) in a conventional manner to prevent hydraulic lifting of the fuel assembly caused by upward coolant flow while allowing for changes in fuel assembly length due to core induced thermal expansion and the like. Disposed within the opening defined by the sidewalls of the top nozzle 32 is a conventional rod cluster control assembly 38 having radially extending flukes 40, being connected to the upper end of the control rods 42, for vertically moving the control rods in the control rod guide thimbles 24 in a well known manner. To form the fuel assembly 20, support grids 26 and mixing vane grid structure 34 are attached to the longitudinally extending guide thimbles 24 at predetermined axially spaced locations; the fuel rods 18 are inserted through the grids 26 and grid structure 34; the lower nozzle 22 is suitably attached to the lower ends of the guide thimbles 24; and then the top nozzle 32 is attached to the upper ends of guide thimbles 24. For a more detailed description of the fuel assembly 20, reference should be made to U.S. Pat. No. 4,061,532.

The fuel assembly 20 depicted in the drawings is of the type having a square array of fuel rods 28 with the control rod guide thimbles 24 being strategically arranged within the fuel rod array. Further, the bottom nozzle 22, the top nozzle 32, and likewise the grids 26 are generally square in cross section. In that the specific fuel assembly represented in the drawings is for illustrational purposes only, it is to be understood that neither the shape of the nozzles or the grids, or the number and configuration of the fuel rods and guide thimbles are to be limiting, and the invention is equally applicable to different shapes, configurations, and arrangements than the ones specifically shown.

Before describing the mixing vane grid structure 34 of the present invention in detail, it should be noted that the fuel rods 28 are laterally positioned in a predetermined array by the support or spacer grids 26. These spacer grids are well known in the art and are used to precisely maintain the spacing between fuel rods, prevent rod vibration, provide lateral support, and to some extent, frictionally retain the rods against longitudinal movement. Conventional spacer grids, such as the ones shown and described in U.S. Pat. Nos. 3,379,619 and 4,061,536 are comprised of a plurality of interfitted straps of an egg-crate configuration to form cells for accepting the fuel rods. Each cell supports one fuel rod at a given axial location through the use of spring fingers and protrusions which frictionally engage or contact the fuel rod, normally a six-point support arrangement. In that these spacer grids 26 form no part of the present invention, it should suffice to say that these grids support the fuel rods 28 in an upstanding spaced array and that they may or may not have coolant flow mixing vanes incorporated thereon which is a design consideration of the specific fuel assembly involved.

Coolant Mixing Grid Structure

Now, while referring to FIGS. 2 through 15, with particular reference to FIGS. 2 and 3, the preferred embodiment of the improved grid structure 34, in accordance with the principles of the present invention, will now be discussed in detail. Basically, the grid structure 34 is comprised of a plurality of interleaved inner straps 44 arranged in an egg-crate configuration in defining a plurality of inner cell openings 46 for receiving therethrough respective ones of the fuel rods 28 and in defining a number of thimble cell openings 48 for receiving therethrough respective ones of the guide thimbles 24. Each of the inner straps 44 is formed of interconnecting segments, and through the use of opposing slots, the straps are interlatched. At each intersection 50, the straps are suitably secured together, such as by welding or the like. The arrangement is such that the interconnecting segments of four separate straps 44 form a given inner cell opening 46 or thimble cell opening 48. Associated with each inner cell opening 46 is at least one mixing vane 52 mounted on one of the strap segments which define a given cell opening. Preferably, the mixing vane 52 is mounted on the top edge of the inner strap segment, and in the preferred embodiment, there is a mixing vane 52 mounted on the top edge of each of the inner strap segments 44 associated with each inner cell opening 46 having a fuel rod 28 extending therethrough. The mixing vane 52 is in the shape of a chicken's comb and slightly twisted, being cantilevered from the top edge of the inner strap segment and projecting upwardly and over therefrom toward the longitudinal centerline or axis of the inner cell opening 46. In the preferred embodiment, as best seen in FIG. 3, each of the mixing vanes 52 on one pair of opposing inner strap segments of a given inner cell opening 46 project inwardly toward the cell opening, whereas, each of the mixing vanes on the other pair of opposing strap segments of the same cell opening project into an adjacent cell opening. The arrangement of the mixing vanes 52 is such that on any one inner strap 44, every alternate mixing vane projects into the inner cell openings located either on one side or the other side of the strap. It can be appreciated that the particular orientation of the mixing vanes 52 serves to laterally deflect the upwardly flowing coolant between adjacent fuel rods 28 and it should be noted that neither the specific shape of the mixing vanes 52 or the specific pattern of the mixing arrangement form any part of this invention, the specific shape and mixing pattern described being merely illustrative. For purposes of this invention, it should suffice to say that a mixing vane is associated with each of the inner cell openings and that this mixing vane extends into the cell opening.

During operation of fuel assembly 20, the fuel rods 28 tend to bend and bow due to the thermal stresses, and thus, to prevent the fuel rods from coming into damaging impact or contact with the mixing vanes 52, each inner cell opening 46, having a fuel rod extending therethrough and a mixing vane mounted thereon, is provided with a protrusion or dimple 54 which extends into the cell opening to a greater extent than the associated mixing vane 52. The protruding dimple 54 of a given cell opening 46 is mounted below the mixing vane 52, on the lateral face of one of the inner strap segments 44, and projects into and generaly perpendicularly toward the longitudinal axis of the inner cell opening. Preferably, there are four such dimples being located on a different one of the four inner strap segments that define the cell opening.

As seen in FIG. 3, the distance between opposing protrusions or dimples 54 associated with each inner cell opening 46 is greater than the diameter of the associated fuel rod 28 disposed within each inner cell opening. In view of such relationship between the diameter of a fuel rod 28 and the distance between opposing dimples 54 in the cell opening 46 through which the fuel rod extends, it is readily apparent that, unlike the support grids 26, the mixing vane grid structure 34 does not support the fuel rods 28 received through its cell openings 46. Thus, the protrusions or dimples 54 do not perform a fuel rod supporting function in the grid structure 34 of the present invention. In the preferred embodiment, each of the dimples 54 are oriented on its respective inner strap segment so as to permit the upwardly flowing coolant to pass through the dimple in thereby reducing the pressure drop of the coolant flow through the grid structure 34. As best seen in FIG. 3, the dimples 54 are transversely running arches, preferably of a generally trapezoidal shape and are rigid. It is recommended that the dimples 54 be integral with their associated grid straps 44, and the grid straps 44 with integral dimples 54 be made from a low neutron capture cross section material, such as zirconium or a zirconium alloy. The dimples 54 are formed on their associated grid straps by a conventional stamping operation.

The relationship of the dimples 54, of a given inner cell opening 46, can best be seen by referring to FIGS. 8 through 11 which show the respective dimple on each of the four straps 44 that define the cell opening. The relationship is such that two of the dimples lie in a first horizontally extending plane, whereas, the other two of the four dimples lie in a second horizontally extending plane which is parallel to and axially spaced below the first horizontal plane. It can be seen from these views that each inner strap segment has two dimples 54 formed thereon, one below the other, with one of the dimples projecting into one of the inner cell openings whereas the other one of the dimples projects into an adjacent inner cell opening. The specific arrangement of the dimples 54, of the inner cell opening of FIG. 3 from which the section lines 8—8 through 11—11 were taken, is such that the two dimples associated with the two adjacent straps located in the upper left-hand corner are disposed in an upper horizontal plane, whereas, the two dimples associated with the adjacent straps located in the lower right-hand corner are disposed in a lower horizontal plane. This dimple arrangement alternates between adjacent inner cell openings 46. It should be pointed out that the specific arrangement of the dimples within a given inner cell opening is not critical to the present invention, but what is important is the existence of at least one such dimple for each associated mixing vane of a given inner cell opening and that the dimple projects further into the cell opening than does the vane.

While still referring to FIG. 3, there has been shown for illustrational purposes, six separate fuel rods 28, being represented in phantom lines, disposed within six separate inner cell openings 46. As can be clearly seen, the fuel rod 28 in the inner cell opening located at the top portion of FIG. 3 (the second cell opening from the right side) does not touch either of the four dimples 54 associated with that cell opening or the mixing vanes 52 which project into the cell opening; however, in each of the other five illustrations, the fuel rod, which has been bent or bowed from thermal induced stresses, is in contact with one or another one of the four dimples associated with the respective cell opening. As seen, should a fuel rod move transversely across the cell opening it would contact one or another one of the dimples, thus, preventing damaging impact of the fuel rod with one of the mixing vanes.

As mentioned earlier, the egg-crate configuration of the inner interleaved straps 44 also define a number of thimble cell openings 48. In the preferred embodiment, as best seen in FIGS. 12 through 15, a short sleeve 56 is disposed in each of the thimble cell openings 48 for mounting the grid structure 34 on the control rod guide thimbles 24. The sleeve 56 is suitably attached, such as by welding or the like, to the lateral faces of the four respective inner strap segments associated with the thimble cell opening 48. The guide thimble 24 (only shown in FIG. 1) extends through the sleeve 56 and is attached to the sleeve, in a conventional manner, such as by bulge expanding or the like. If desired, the guide thimbles 24 may be attached directly to the inner strap segments of the thimble cell opening, and in such case, no sleeves would be used. Referring back to FIG. 3, it can be seen that there are no dimples 54 projecting into the thimble cell opening 48, nor do any of the mixing vanes 52 mounted on the inner strap segments associated with the thimble cell opening project into the thimble cell opening, these mixing vanes project over and into adjacent inner cell openings 46.

Figure 2:
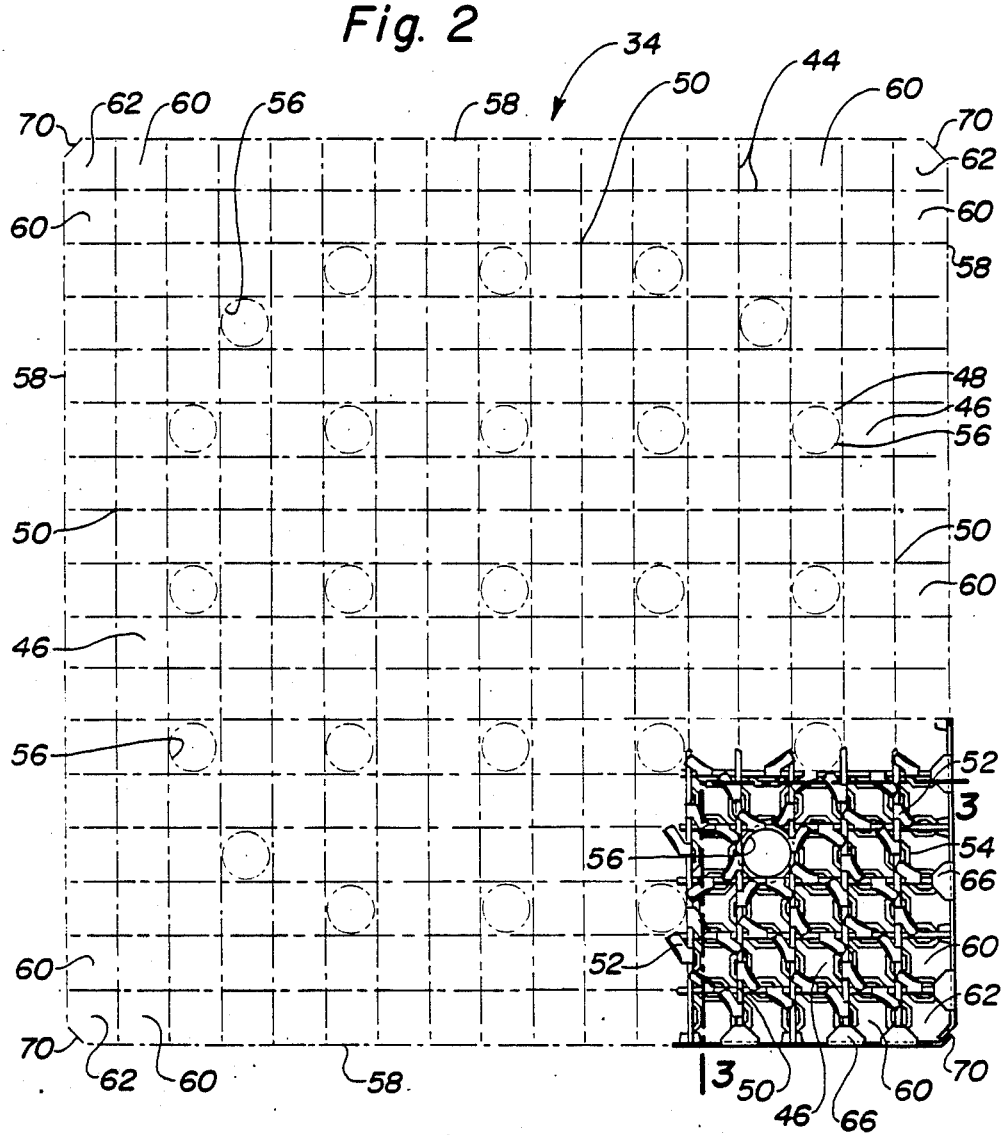
FIG. 2 is a top plan view, as seen along line 2—2 of FIG. 1, of the mixing vane grid structure of the present invention, being shown partially in outline form with the lower right hand corner section thereof being shown in detail as representative of the construction of the grid structure.
Figure 3:
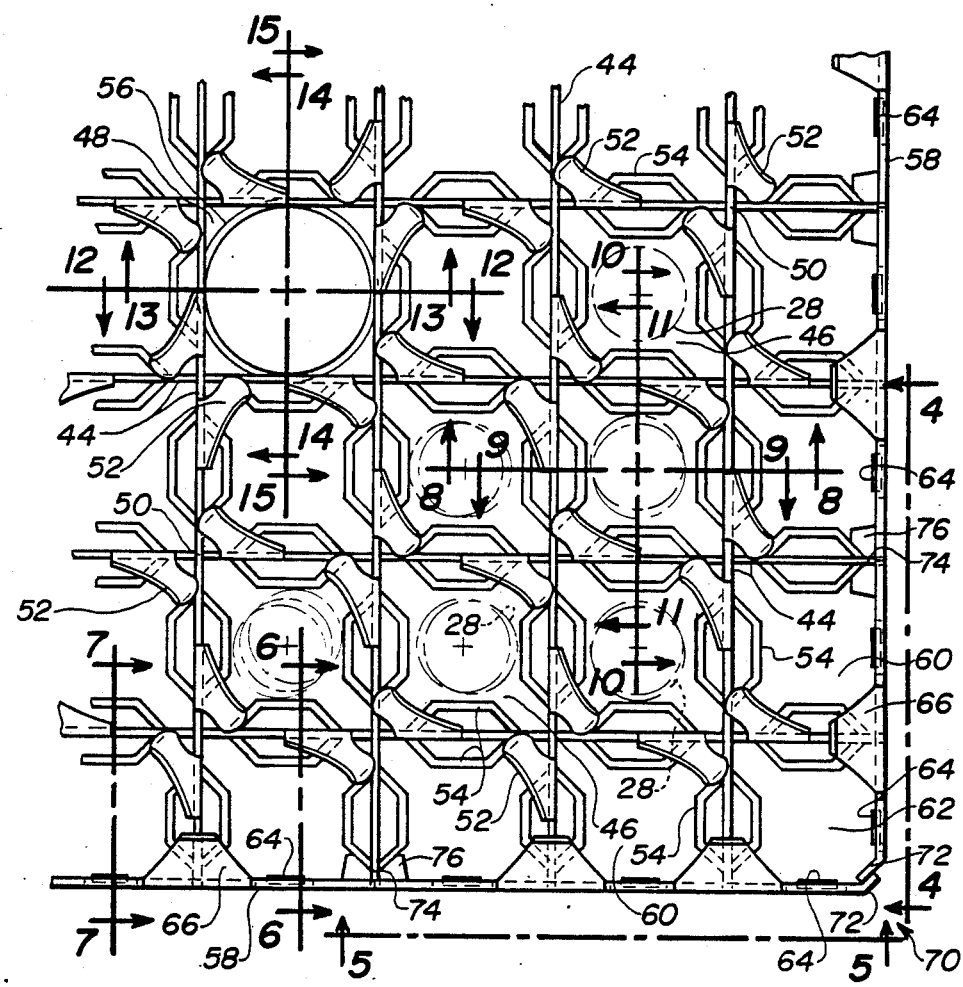
FIG. 3 is an enlarged view of the corner section 3—3 of the grid structure shown in FIG. 2.

As best seen in FIGS. 2 and 3, the improved grid structure 34 further includes an outer peripheral strap 58 attached to the respective terminal ends of the inner straps 44 to form an integral structure and in defining a number of border cell openings 60 which are adapted to accept respective ones of the fuel rods 28. The attaching of inner straps 44 to the outer strap 58 is a well known operation, and normally short extensions are provided on the ends of the inner straps which project through corresponding slots in the outer strap. The intersection of the inner strap with the outer strap is welded, and then the extension portions extending through the outer strap are ground off flush with the outer strap. Each border cell opening 60, is formed by three inner strap segments and a segment of the outer strap, except for the four corner border cell openings 62 which are formed by two inner strap segments and two segments of the outer strap. The border cell openings 60 are similar in construction to the inner cell openings 46 and include at least one mixing vane 52 mounted on the top edge of at least one of its inner strap segments and, preferably, there are three dimples 54, one dimple being mounted on each of the three inner strap segments. The corner border cell openings 62 are also similar in construction, having at least one mixing vane on one of its inner strap segments and a dimple formed on both of its inner strap segments. The mixing vanes and the dimple associated with each of the border cell openings 60, 62 are identical to the mixing vanes 52 and dimples 54 associated with an inner cell opening 46. Formed on the outer strap segment of each border cell opening 60 is a pair of axially spaced protrusions 64, whereas, the two outer strap segments associated with a corner border cell opening 62 each contain one such protrusion, identical to protrusion 64 (see FIGS. 4 and 5). Protrusions 64 project only slightly into the respective border cell openings 60 and 62, are generally longitudinally running arches, and generally trapezoidal in shape. The orientation of protrusions 64 is such that they are closed to the passage of the longitudinal coolant flow therethrough.

Figure 4:
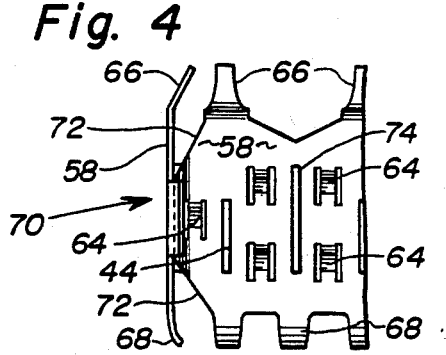
FIG. 4 is an elevational view of a portion of the outer strap on the right-side of the grid structure as represented by line 4—4 of FIG. 3.
Figure 5:
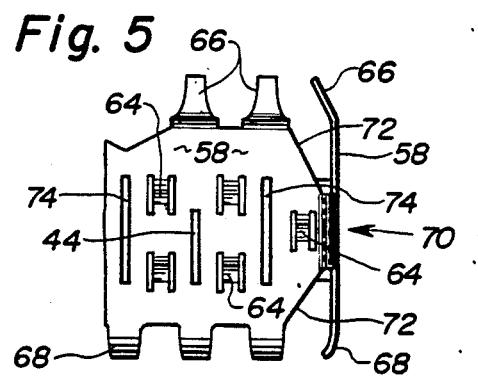
FIG. 5 is an elevational view of the front outer strap of the grid structure as represented by line 5—5 of FIG. 3.
Figure 10:
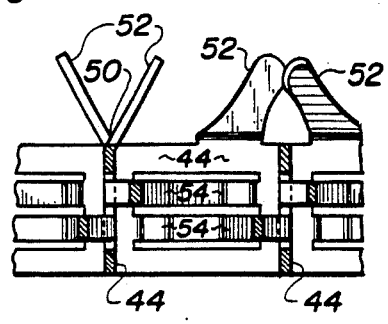
Figure 11:
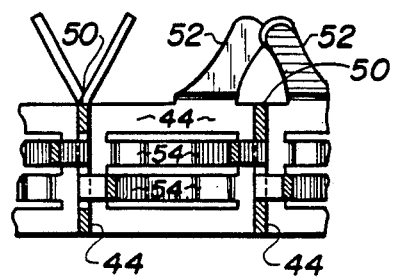
Figure 12:
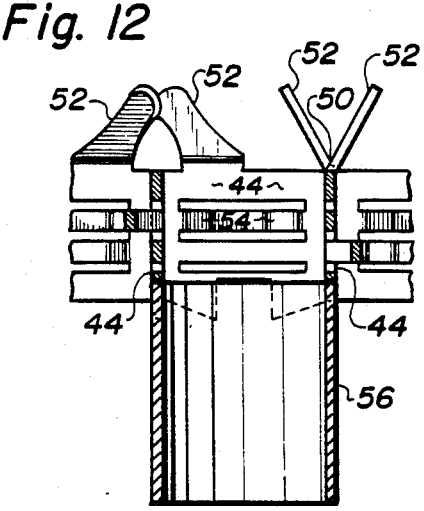
FIGS. 12, 13, 14 and 15 are all sectional views, as taken along respective lines 12—12, 13—13, 14—14 and 15—15 of FIG. 3, showing the four inner strap segments associated with a given thimble cell opening and the attachment of a sleeve within said opening for mounting of the grid structure on the control rod guide thimbles.
Figure 13:
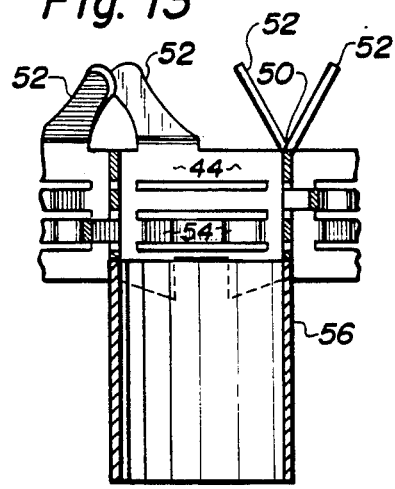
Figure 14:
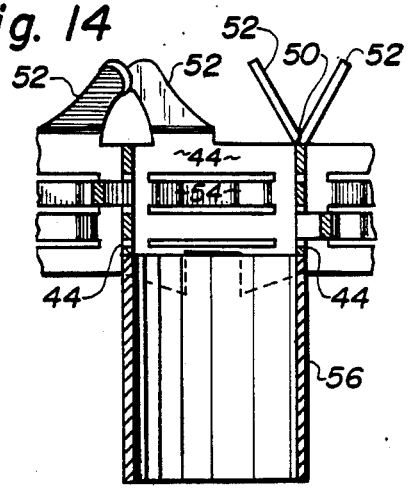
Figure 15:
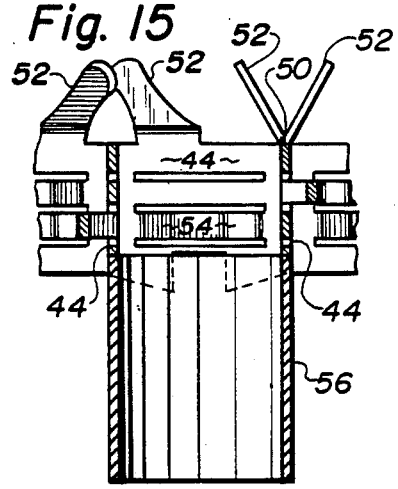

As best seen in FIGS. 4 and 5, mounted on the upper lengthwise edge of the outer strap 58, at predetermined locations therealong, is a series of cantilevered fins 66 that project upwardly and inwardly toward the longitudinal axis of the grid structure 34. Fins 66 serve to deflect the upwardly flowing coolant away from the outer periphery of the grid structure and across the fuel rods 28. Mounted on the lower lengthwise edge of the outer strap 58, at predetermined locations therealong, is a series of inwardly curved tabs 68. Tabs 68 facilitate in the assembling of the grid structure 34 on the guide thimbles 24 and also assist in preventing one fuel assembly from catching on or interfering with an adjacent fuel assembly, as the fuel assemblies are slid longitudinally past one another during loading and unloading of a reactor core. Preferably, fins 66 and tabs 68 are integrally formed on the outer strap 58.

Again referring to FIG. 2, it can be seen that the grid structure 34, in plan view, is generally square in shape with the outer peripheral strap 58 being formed of four separate straps attached together in defining four separate corners 70. Preferably, the terminal end portions of each pair of adjacent outer straps forming a respective corner 70 is provided with a pair of diverging chamfers 72, with each chamfer being at least 52 degrees from a vertical axis (see FIGS. 4 and 5, and also FIGS. 6 and 7). In the past, during loading and unloading of fuel assemblies in a reactor core, one fuel assembly would become entangled with another fuel assembly. This was mainly due to the respective grid corners interfering with one another. Such problem has been substantially eliminated by chamfering the corners 70 of grid structure 34.

To reduce the pressure drop in the fuel assembly 20, grid structure 34 has been specifically designed with a minimum of parasitic material. As best seen in FIGS. 6 and 7, the height "h" in the longitudinal or axial direction of each of the inner straps 44 is the same, whereas, the height "H" in the longitudinal direction of the outer strap 58 is substantially greater than the height "h" of the inner straps 44. Even though the height of the inner straps 44 have been substantially reduced, the structural integrity of grid structure 34 has been maintained. It can be seen in FIG. 1 that grid structure 34 is "undersized" as compared to spacer grid 26. The greater height "H" of the outer strap 58 not only provides a relatively long linear surface for sliding past an adjacent fuel assembly, but, in addition thereto, it enables the chamfers 72 on its corners 70 to be of a sufficient linear length whereby corresponding grids on adjacent fuel assemblies will easily slip past one another.

In that the height of the outer strap 58 is substantially greater than the height of the inner strap 44, with its upper and lower linear portions or segments extending beyond the respective upper and lower edges of the inner straps 44, the grid structure 34 is provided with reinforcing webs on the terminal end portions of some of its inner straps in forming a more rigid structure and to prevent the outer strap 58 from warping and bowing. More particularly, while still referring to FIGS. 6 and 7, an upper reinforcing web 74 is integrally formed on the upper edge of the terminal end portion of the inner strap 44, while a smaller, lower reinforcing web 76 is formed on the lower edge of the terminal end portion of the inner strap. Upper web 74 slopes upwardly and outwardly from the top edge of the inner strap to the lateral face of the outer strap, and accordingly, lower web 76 slopes downwardly and outwardly from the lower edge of the inner strap to the lateral face of the outer strap. As can be appreciated, with the addition of webs 74 and 76, the height of the terminal end edge of the inner strap has been substantially increased in thereby providing a longer lineal surface for reinforcing and strengthening the attachment connection of the inner straps 44 with the outer strap 58. In the preferred embodiment, only one of the terminal end portions of each of the inner straps 44 is provided with an upper web 74. The inner straps 44 are so arranged such that every other one of the strap's end portion on a given side of the grid structure is provided with a web 74 (this arrangement can best be seen in reviewing FIGS. 3, 6 and 7).

Figure 16:
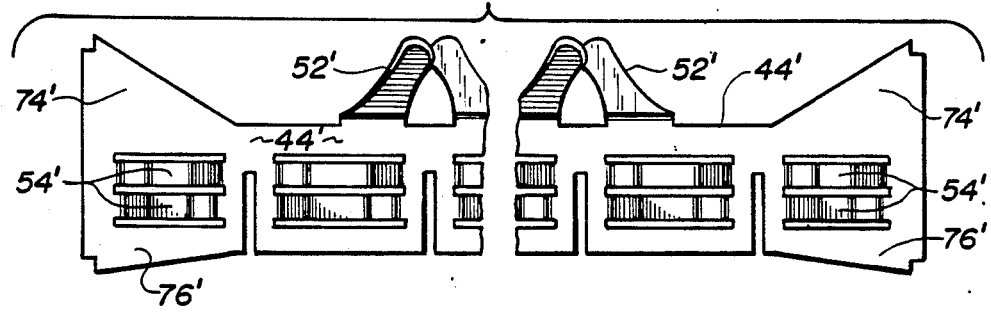
FIG. 16 is an elevational view of an alternative embodiment of an inner strap for forming the grid structure. In this view, each end portion of the inner strap includes an integrally formed reinforcing web for attachment to the outer peripheral strap.

FIG. 16 shows an alternative embodiment of an inner strap, designated by the numeral 44', which can be used to form the grid structure 34. Inner grid strap 44' is substantially identical to grid strap 44 with identical mixing vanes 52' and dimples 54', except that each of its respective terminal end portions is provided with an upper reinforcing web 74' and a lower reinforcing web 76'. Reinforcing webs 74' and 76' are identical to webs 74 and 76.

It is thought that the invention and many of its attendant advantages will be understood from the foregoing description and it will be apparent that various changes may be made in form, construction and arrangement of the grid structure 34 without departing from the spirit and scope of the invention or sacrificing all of its material advantages, the form hereinbefore being merely a preferred or exemplary embodiment thereof.

What is claimed is:

1. In a nuclear reactor fuel assembly including a number of longitudinally extending control rod guide thimbels, and a plurality of transverse grids axially spaced along said thimbels for supporting an array of upstanding fuel rods, a flow mixing nonsupport grid structure mounted on said thimbels and disposed between a pair of adjacent fuel rod support grids for promoting the mixing of a coolant as it flows longitudinally upwardly along and between the fuel rods, said grid structure comprising:

(a) a plurality of inner interleaved straps arranged in an egg-crate configuration in defining a plurality of inner cell openings for receiving therethrough respective ones of said fuel rods;

(b) at least one mixing vane mounted on one of the inner straps associated with each inner cell opening having a fuel rod extending therethrough, said mixing vane projecting upwardly and inwardly toward the longitudinal axis of said cell opening for deflecting the upwardly flowing coolant laterally from one fuel rod to an adjacent fuel rod; and (c) a protrusion associated with each mixing vane and mounted on said inner strap and extending into said cell opening toward said longitudinal axis of said cell to a greater extent than said mixing vane so as to prevent damaging impact of said fuel rod with said vane, but not so far as to normally contact the fuel rod, should said fuel rod move transversely across said cell opening, the distance across each said inner cell opening between said interleaved straps with said protrusion mounted thereon being greater than the diameter of said one fuel rod received through said inner cell opening such that said fuel rod is unsupported within said cell opening, said protrusion being a generally transversely running arch which is rigid and generally trapezoidal shaped, projects generally perpendicularly toward said longitudinal axis of said cell opening and is oriented to permit the upwardly flowing coolant to pass therethrough in thereby reducing the pressure drop of said coolant flow through said grid structure.

2. In a nuclear reactor fuel assembly including a number of longitudinally extending control rod guide thimbles, and a plurality of transverse grids axially spaced along said thimbles for supporting an array of upstanding fuel rods, a flow mixing nonsupport grid structure mounted on said thimbles and disposed between a pair of adjacent fuel rod support grids for promoting the mixing of a coolant as it flows longitudinally upwardly along and between the fuel rods, said grid structure comprising:

(a) a plurality of inner interleaved straps arranged in an egg-crate configuration in defining a plurality of inner cell openings for receiving therethrough respective ones of said fuel rods, said inner straps having interconnected segments forming said inner cell openings, each inner cell opening being defined by four inner strap segments;

(b) a mixing vane mounted on a top edge of each of said inner strap segments associated with each inner cell opening having a fuel rod extending therethrough, said mixing vane projecting upwardly and inwardly toward the longitudinal axis of said cell opening for deflecting the upwardly flowing coolant laterally from one fuel rod to an adjacent fuel rod; and (c) a protrusion mounted on each of said inner strap segments which defines one of said inner cell openings and mounts a mixing vane, said protrusion being disposed below said mixing vane and extending into said cell opening toward said longitudinal axis of said cell to a greater extent than said mixing vane, but not so far as to normally contact the fuel rod, so as to prevent damaging impact of said fuel rod with said vane should said fuel rod move transversely across said cell opening, the distance across each said inner cell opening between said interleaved strap segments with said protrusions mounted thereon being greater than the diameter of said one fuel rod received through said inner cell opening such that said fuel rod is unsupported within said cell opening; each of said four protrusions associated with said respective four inner strap segments defining each inner cell opening being a generally transversely running arch oriented to permit the upwardly flowing coolant to pass through said cell opening and thereby reduce the pressure drop on said grid structure, two of said four protrusions associated with an inner cell opening lying in a first horizontal plane and the other two of said four protrusions lying in a second horizontal plane being parallel to and axially spaced below said first horizontal plane.

3. In a nuclear reactor fuel assembly including a number of longitudinally extending control rod guide thimbles, and a plurality of transverse grids axially spaced along said thimbles for supporting an array of upstanding fuel rods, a flow mixing nonsupport grid structure mounted on said thimbles and disposed between a pair of adjacent fuel rod support grids for promoting the mixing of a coolant as it flows longitudinally upwardly along and between the fuel rods, said grid structure comprising:

(a) a plurality of inner interleaved straps arranged in an egg-crate configuration in defining a plurality of inner cell openings for receiving therethrough respective ones of said fuel rods;

(b) an outer strap attached to respective terminal ends of said inner straps in forming an integral structure therewith and defining a number of border cell openings for receiving therethrough other ones of said fuel rods;

(c) a series of fins mounted at predetermined locations along a top edge of said outer strap and projecting inwardly therefrom for deflecting the upwardly flowing coolant away from the outer periphery of said grid structure and toward its longitudinal axis;

(d) a series of inwardly curved tabs mounted at predetermined locations along a lower edge of said outer strap to facilitate the mounting of said grid structure as it is axially slid down over and along said control rod guide thimbles;

(e) a longitudinally extending dimple formed on a lateral face of said outer strap associated with each said border cell opening and projecting into said border cell opening, said dimple being closed to the longitudinal flow of coolant therethrough;

(f) mixing vanes mounted on said inner straps associated with said inner cell openings and border cell openings having fuel rods extending therethrough, said mixing vanes projecting upwardly and inwardly toward the longitudinal axes of said respective inner and border cell openings for deflecting the upwardly flowing coolant laterally from one fuel rod to an adjacent fuel rod; and (g) protrusions associated with said respective mixing vanes and mounted on said inner straps and extending into said respective inner and border cell openings toward said longitudinal axes of said respective inner and border cells to a greater extent than said respective mixing vanes, but not so far as to normally contact the fuel rod, so as to prevent damaging impact of said fuel rods with said respective vanes should said fuel rods move transversely across said inner and border cell openings, the distance across each said inner and border cell openings between said interleaved outer and inner straps with said protrusions mounted thereon being greater than the diameter of said one fuel rod received through said each border inner cell opening such that said fuel rod is unsupported within said cell opening, said each protrusion associated with each said border and inner cell opening being in the form of a generally rigid, transversely extending arch oriented to permit the upwardly flowing coolant to pass therethrough.

* * * * *